US007823694B2

(12) United States Patent
Motes (10) Patent No.: US 7,823,694 B2
(45) Date of Patent: Nov. 2, 2010

(54) MOTORIZED CLIMBING HUNTING STAND

(75) Inventor: Michael Joel Motes, North Little Rock, AR (US)

(73) Assignee: Motes Outdoor Equipment, LLC, North Little Rock, AK (US)

( * ) Notice: Subject to any disclaimer, the term of this patent is extended or adjusted under 35 U.S.C. 154(b) by 709 days.

(21) Appl. No.: 11/799,969

(22) Filed: May 3, 2007

(65) Prior Publication Data

US 2008/0271948 A1    Nov. 6, 2008

(51) Int. Cl.
*A63B 27/00*   (2006.01)
(52) U.S. Cl. .................................. 182/133; 182/187
(58) Field of Classification Search .............. 182/187, 182/133, 141, 270, 116
See application file for complete search history.

(56) References Cited

U.S. PATENT DOCUMENTS

| 2,796,299 A * | 6/1957 | Freeman ...................... 52/111 |
| 3,313,376 A * | 4/1967 | Holland, Sr. ................. 187/241 |
| 3,548,970 A * | 12/1970 | Hutchens, Sr. .............. 182/129 |
| 4,433,752 A * | 2/1984 | Gunter ......................... 182/82 |
| 5,143,181 A * | 9/1992 | Bixby ......................... 187/242 |
| 5,542,496 A * | 8/1996 | St. Denis .................... 182/133 |
| 5,927,440 A * | 7/1999 | Freeman ...................... 187/270 |
| 6,779,634 B1 * | 8/2004 | Slagle ......................... 187/251 |
| 7,281,607 B1 * | 10/2007 | Kiraly .......................... 182/82 |
| 2004/0140157 A1 * | 7/2004 | Undi ........................... 182/187 |
| 2004/0168854 A1 * | 9/2004 | Azran .......................... 182/141 |
| 2007/0169996 A1 * | 7/2007 | Blue et al. ................... 182/141 |
| 2008/0211364 A1 * | 9/2008 | Solheid et al. ............. 312/293.1 |
| 2008/0271948 A1 * | 11/2008 | Motes ......................... 182/141 |

* cited by examiner

*Primary Examiner*—Katherine W Mitchell
*Assistant Examiner*—Candace L. Bradford
(74) *Attorney, Agent, or Firm*—Stephen O. Carver (57) ABSTRACT

A motorized, climbing tree stand ideal for hunting has a rigid elongated, track constructed from multiple, axially aligned sections attached to a tree trunk. A carriage supporting a seat and footrest is coupled to a shuttle assembly that engages the track. The shuttle assembly mounts a battery-powered motor and a motor-driven gear that engages a toothed rack on the elongated track, moving the carriage vertically upwardly or downwardly in response to motor operation. A hand switch controls a reversing relay to control motor direction. Each track section comprises a rigid, elongated flange with an elongated, tubular sleeve terminating in a reduced diameter coupling tube that coaxially mates with the base of the sleeve in the neighboring section. Alignment rods near the upper ends of each sleeve reinforce the assembly. Adjustable, L-brackets contact the tree for bracing. Track flanges are slidably constrained between suitable rollers secured to shuttle side walls.

3 Claims, 14 Drawing Sheets

MOTORIZED CLIMBING HUNTING STAND

BACKGROUND OF THE INVENTION

1. Field of the Invention

The present invention relates generally to elevated hunting or observation stands. More particularly, the present invention relates to hunting stands, primarily for use with trees, that transport the user to a desired elevation above ground. Known prior art stands are classified in United States Patent Class 182, Subclasses 133, 135-137, 141, and 187-188.

2. Description of the Related Art

Hunters have long recognized and appreciated the many advantages gained by hunting from elevated positions, especially with modern tree stands. Stands that have been properly designed and correctly deployed comfortably provide a safe, seated position at an elevation that is ideal for inconspicuously observing and bagging game animals. An elevated position amplifies the hunter's field of view, enlarging the potential target area.

Numerous diverse tree stands exist in the art. Large, relatively heavy permanent stands are well known. When properly built they can provide a sheltered hunting position well above ground offering superb visibility about a 360 degree radius. Permanent stands have several advantages. For example, they can comfortably accommodate more than one hunter, and they are spacious enough to move about. Some permanent stands have generous storage space, and they may even have electricity and various appliances. However, permanent stands are difficult and time consuming to erect, and as a practical matter, they cannot be moved between hunting locations without significant time-consuming effort.

On the other hand, portable tree stands are lightweight, relatively compact, and readily transportable. They can easily be carried into the woods for subsequent erection and use, and when a different hunting location is preferred, they readily disassemble for rapid deployment elsewhere. Portable stands typically comprise a seat supported upon a frame that is adapted to be semi-permanently attached to a tree. In typical "climber" designs, a compound frame has a pair of hinged members that that encircle the tree trunk. The frame elements are intermittently moved into and out of binding contact with the tree truck in response to user movement, and upward movement is enabled. As one fame element is loosened, it can be lifted vertically, while the other frame element temporarily remains in binding contact with the tree trunk.

Non-climbing tree stands often have seats supported above ground by one or more vertical ladder elements that elevate the frame. The seat, which may be swiveled for limited rotation so that a large ground radius may be conveniently observed, provides a comfortable and stable rest for the hunter. The frame may be anchored to the tree above ground by suitable teeth or pointed flanges that are forcibly locked into engagement with the tree truck by an encircling chain or rope that is tightened by a clamp or turnbuckle. Many portable designs are deployed at a selectable elevation established by the number and length of the ladder elements used by the stand. Once fastened in position, the seat cannot be easily moved vertically. In such designs the hunter gains access to the elevated seat by carefully ascending the ladder.

With climbing stands, on the other hand, the hunter may seat himself within the stand at ground level, and thereafter physically manipulate the stand to gradually climb the tree. Examples of manually-operated, climbing tree stands are provided by U.S. Pat. No. 3,727,723 issued Apr. 17, 1973, and U.S. Pat. No. 5,647,454 issued Jul. 15, 1997.

Other approaches to elevating tree stands exist. For example, U.S. Pat. No. 3,568,797 issued Mar. 9, 1971 discloses a stand with a collapsible seat housed within a frame moved by a hand-cranked pulley system. When the stand is attached to a tree it can be manually raised to the desired elevation with the pulley system. Similar crank-operated tree stand systems are seen in U.S. Pat. No. 3,731,762 issued May 8, 1973, U.S. Pat. No. 4,347,913 issued Sep. 7, 1982, U.S. Pat. No. 4,602,698 issued Jul. 29, 1986, U.S. Pat. No. 4,694,934 issued Sep. 22, 1987, and U.S. Pat. No. 5,009,284 issued Apr. 23, 1991.

A variation of the cable-driven theme is seen in U.S. Pat. No. 6,079,517 issued Jun. 27, 2000, showing a power driven tree stand that combines a winch with wheels that contact the tree truck.

A similar cable-elevated, wheeled carriage is seen in the powered deer stand depicted in U.S. Pat. Application No. 2003/0178251 published Sep. 25, 2003.

Motorized or power-driven tree stands are also known in the art. Since many hunters are elderly or physically handicapped or otherwise physically incapacitated, powered deer stands have recognized advantages. For example, U.S. Pat. No. 4,811,803 issued Mar. 14, 1989 illustrates a self-propelled deer stand that elevates hunters above the ground. A pivoted chassis rotates to a vertical position when the structure is raised off the ground. The deer stand uses a motor-powered winch and a cable assembly that elevates it.

However, there is a need or a power-driven hunting stand that avoids the use of cables or overhead chains or hoists. Such designs are cumbersome and difficult to deploy, especially for handicapped or elderly hunters. When installed carelessly or inadequately, they tend to be unstable. Often cable-driven designs require deployment, at least in part, upon an overhead branch, which can be difficult to reach, particularly when mounting the tree stand on pine trees. Further, cable-driven power stands do not adequately brace themselves against the tree trunk, increasing the risk of falling or slipping. Known systems involving wheels that contact the tree trunk are unstable and they tend to slip. Insufficient traction is developed by the wheels that rub against the external tree trunk.

Furthermore, there is a need for a power driven deer stand that is essentially portable.

While some portable designs are quite rugged despite their light weight, one common problem with so-called portable stands is that they can be relatively flimsy and unstable. On the other hand, ruggedized, heavy duty designs made of bulky metal parts tend to be heavy and cumbersome. However, it is important to realize that the disadvantages associated with heavier tree stands are outweighed by their dexterity. In the past, for example, hunters often preferred lightweight deer stands that could be easily carried in a backpack and quickly deployed after a single trip into the woods. Thus lightweight climbing stands have been popular. However, while a deer stand that can be carried into the woods in a single trip has obvious advantages, many hunters no longer demand such simplicity. Larger, heavier "portable" stands that can be carried by one or more hunters, or by a single hunter who makes separate trips, have significant advantages. What is important with heavier "portable" designs is that the parts, once transported, fit together easily on the job site for quick erection, and that the assembled unit operates safely and reliably. In this regard, it should be appreciated that a heavy-duty "portable" stand may be as stable a hunting platform as the typical elevated "permanent" stand.

The number of parts required to assemble the stand, or the number of trips into the woods carrying parts, is not critical to many users. It is not uncommon these days that heavier "portable" tree stands be delivered to the hunting site in an all-terrain vehicle or pickup truck, avoiding the necessity for time consuming trips where the hunter manually carries the stand's parts. Usually such stands are deployed by a group of hunters several days before the hunting season, so portability, light weight and speed of erection are features that are gradually diminishing in importance.

What is important to many hunters is that the stand be easy to climb. Thus a powered stand that transports the hunter to the desired elevated hunting position is desirable. Typical climbing stands that are operated manually are of no value to handicapped or elderly hunters. If a heavy duty "portable" stand that is rugged and powered can elevate the hunter automatically to an elevated position, the disadvantages associated with increased weight will be forgotten and excused. Further, such a system must offer a stable and safe support once deployed, and ease of both ingress and egress must be facilitated.

BRIEF SUMMARY OF THE INVENTION

This invention provides a motorized, elevating device that safely and reliably elevates a user to a desired vertical elevation along an elongated, cylindrical object such as a pole. Preferably the device functions as a deer stand, and it is deployed within the woods against a selected tree. My invention provides a power means to elevate the hunter to a desired position vertically above ground.

The motorized, climbing stand is ideal for hunting. An elongated, track constructed in the field from multiple, axially aligned sections, is attached to a tree trunk by suitable clamps or bands. A carriage with a comfortable seat is coupled to a shuttle assembly that engages the track. The shuttle assembly mounts a motor and a driven gear that engages the track, enabling the carriage to move vertically upwardly or downwardly in response to motor operation.

Each track section comprises a rigid, elongated flange is flat. The front of each flange has a section of toothed rack with teeth adapted to be engaged by motor-driven gear. The rack section is coextensive with the flange. The inner side of the flange of each section has an elongated, tubular sleeve coextensive with the flange. A reduced diameter coupling tube projects outwardly from the upper sleeve end, for coaxial mating with the base of the sleeve in the next section. Alignment rods near the upper ends of each sleeve project outwardly with the coupling tubes for reinforcement. Adjustable, two-piece L-brackets welded to the sleeves Contact the tree or column to brace the rack. When the shuttle is penetrated by aligned track sections, the track flanges are slidably constrained between suitable rollers secured to shuttle side walls.

The carriage provides a comfortable seat and a foldable footrest. Suitable orifices defined in frame crosspieces enable coupling to the shuttle. A pair of spaced-apart wings defined on the shuttle releasably engage the carriage frame crosspieces to support the carriage during movement. Preferably a safety lock and a hand crank are provided in case of motor or drive train failure.

Thus, one important and basic object of my invention is to provide a motorized or powered lift for elevating users vertically against a cylindrical object such as a pole or tower or tree.

Another fundamental object is to provide a motorized hunting or deer stand that powers the hunter to the desired elevation.

A related object is to provide a climbing hunter's stand that has a motor-driven seat.

It is also an object to replace manually operated climbing stands.

Another important object of the present invention is to provide a motorized tree stand that is simple to operate and easy to deploy.

Still another object of the present invention is to provide a deer stand of the character described that can be relatively easily disassembled and then transported.

Another important object is to provide a deer stand of the character described that uses a reliable drive propulsion system that does not frictionally rotate against the tree trunk surface.

A general object is to provide a motorized lift of the character described that is adapted for use with a variety of cylindrical objects including poles and trees of different diameters, lengths, and configurations.

Another object is to provide a tree stand that inherently adapts itself for use with trees of different circumferences.

It is another object of the present invention to provide a motorized tree stand of the character described that may be easily and efficiently assembled and deployed.

Another object of the present invention is to provide a motorized tree stand of the character described that enables a hunter to rapidly climb or descend a tree.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
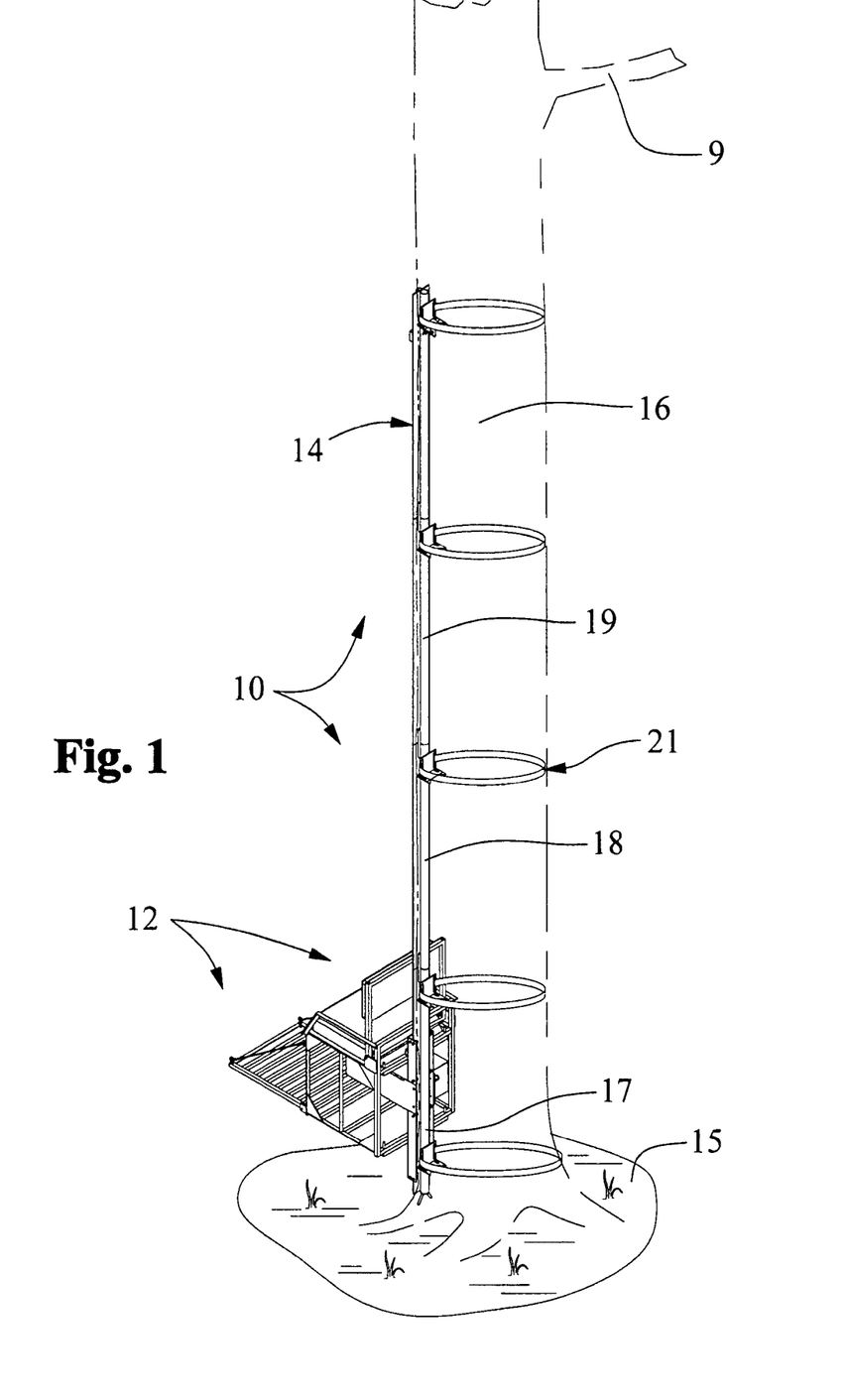
FIG. 1 is a fragmentary isometric view of the tree stand shown in a lowered, user-accessible position proximate a cylindrical object, preferably a tree.
Figure 2:
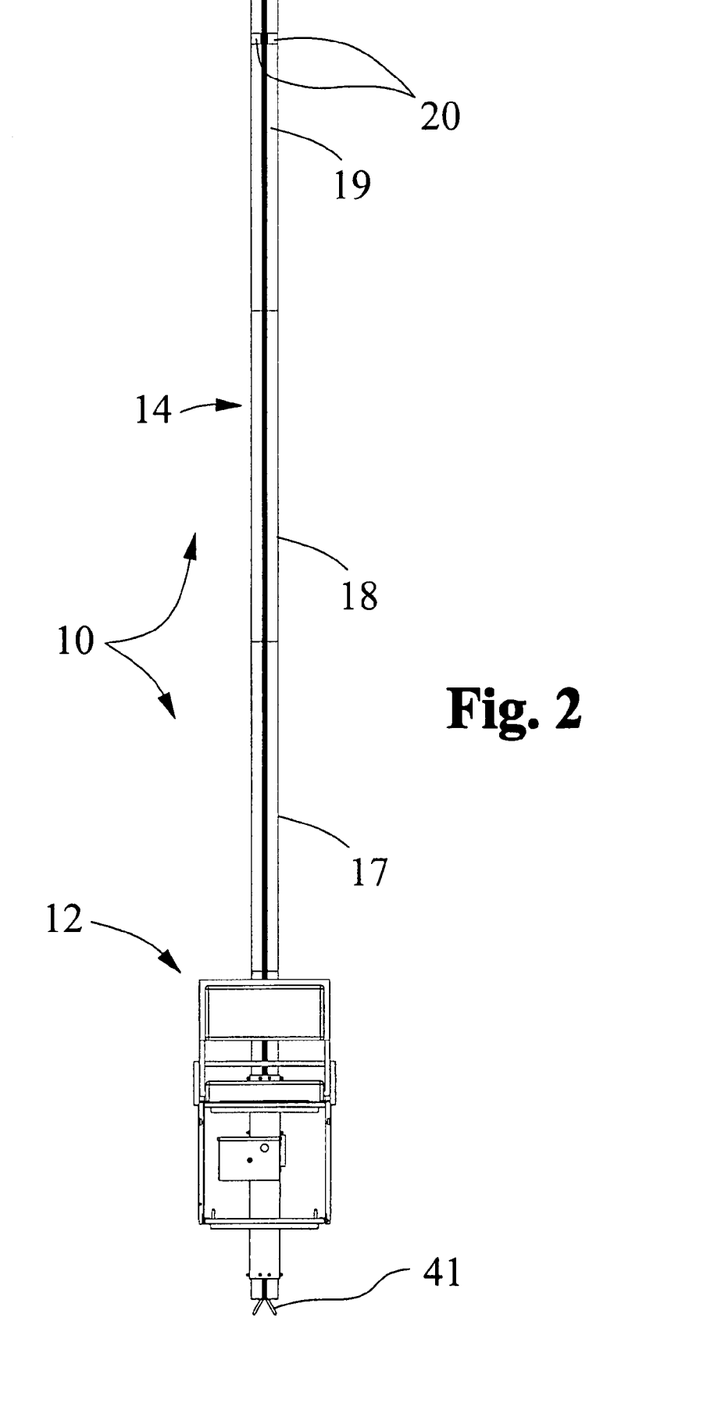
FIG. 2 is a front plan view of the stand.

With initial reference directed now to FIGS. 1 and 2 of the appended drawings, a motorized, climbing device, constructed generally in accordance with the best mode of the invention, has been generally designated by the reference numeral 10. Preferably device 10 is in the form of a hunter's tree-climbing stand. However, the device may be used to climb any elongate, vertical column or pole that is generally cylindrical and which has a smooth lower circumference.

The tree stand embodiment is preferred. The stand 10 is illustrated in a lowered position in FIG. 1, providing access for a hunter or other passenger or user to be seated within a carriage 12 that engages a track 14. Preferably the hunting stand 10 is used by sportsmen or outdoorsmen that desire an elevated observation position for hunting, as is common practice with deer hunters. Of course the stand 10 presents numerous advantages and features that are useful to others besides hunters such as those that service telephone or power lines.

Figure 14:
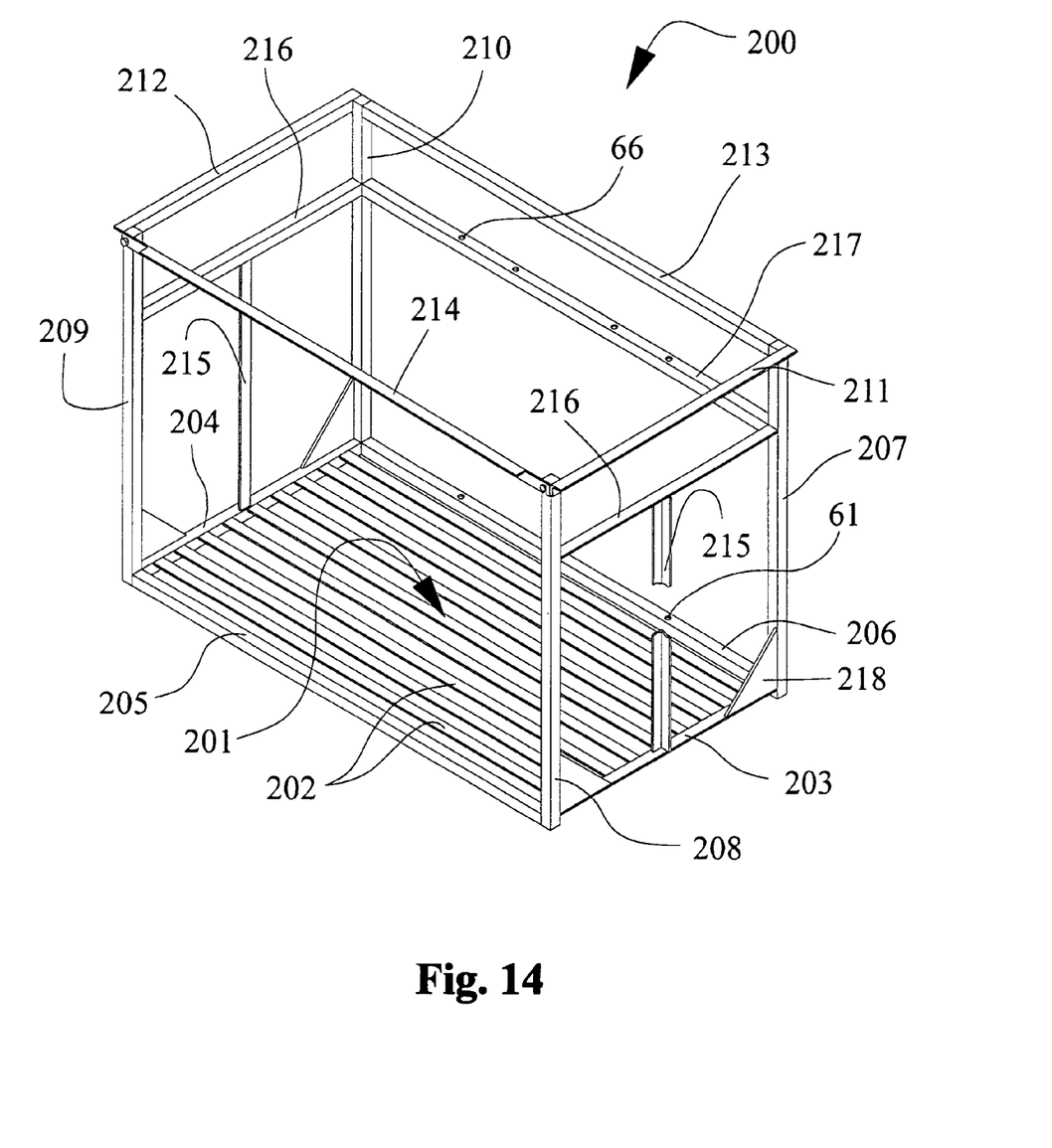
FIG. 14 is a fragmentary isometric view of an alternate, carriage preferably used for pole climbing instead of hunting; and, FIG. 15 is a block diagram of the preferred electrical wiring.

It is preferred that the elongated, sectioned track 14 be secured to the external surface of the vertically upright tree (or column or pole). Preferably the hunting stand is deployed upon a pine tree whose smooth lower regions are free of branches 9 or other obstructions or protrusions that would interfere with vertical travel during normal operation. Although rigid and robust, the various components are relatively lightweight and they may be easily transported into the woods. Once unloaded from the vehicle (i.e., an ATV or pickup truck) at the hunting or job site, they may be securely installed and assembled as hereinafter described. Once the stand 10 is installed, a seated hunter can simply operate toggle switch 252 (FIG. 12) to elevate himself upon carriage 12 several feet above ground 15 to have a commanding view of the desired hunting area proximate tree or column 16. When the alternative carriage of FIG. 14 is deployed, the device 10 functions as an elevator and may be used to service vertically elevated objects such as power lines, telephone lines and the like.

The elongated track 14 preferably comprises several similar, interfitting sections that are axially coupled together at the hunting site. The track is attached to the tree (or column) 16 along an exposed, smooth portion of the tree trunk that is free of obstructions or significant surface irregularities. Alternate, aligned track sections 17, 18, and 19 (i.e., FIGS. 2, 3) for example, are axially fitted together as explained hereinafter and then affixed to the tree trunk by encircling band clamps 21 of conventional construction. Each band clamp comprises an encircling loop 22 (i.e., FIG. 4) whose ends are provided with suitable hooks 23 and turnbuckles that engage rigid L-brackets 24 that are affixed at regular spaced-apart intervals to the rear of each track section (i.e., FIG. 3). A variety of conventional, encircling clams or cables known in the art may be used.

Figure 11:
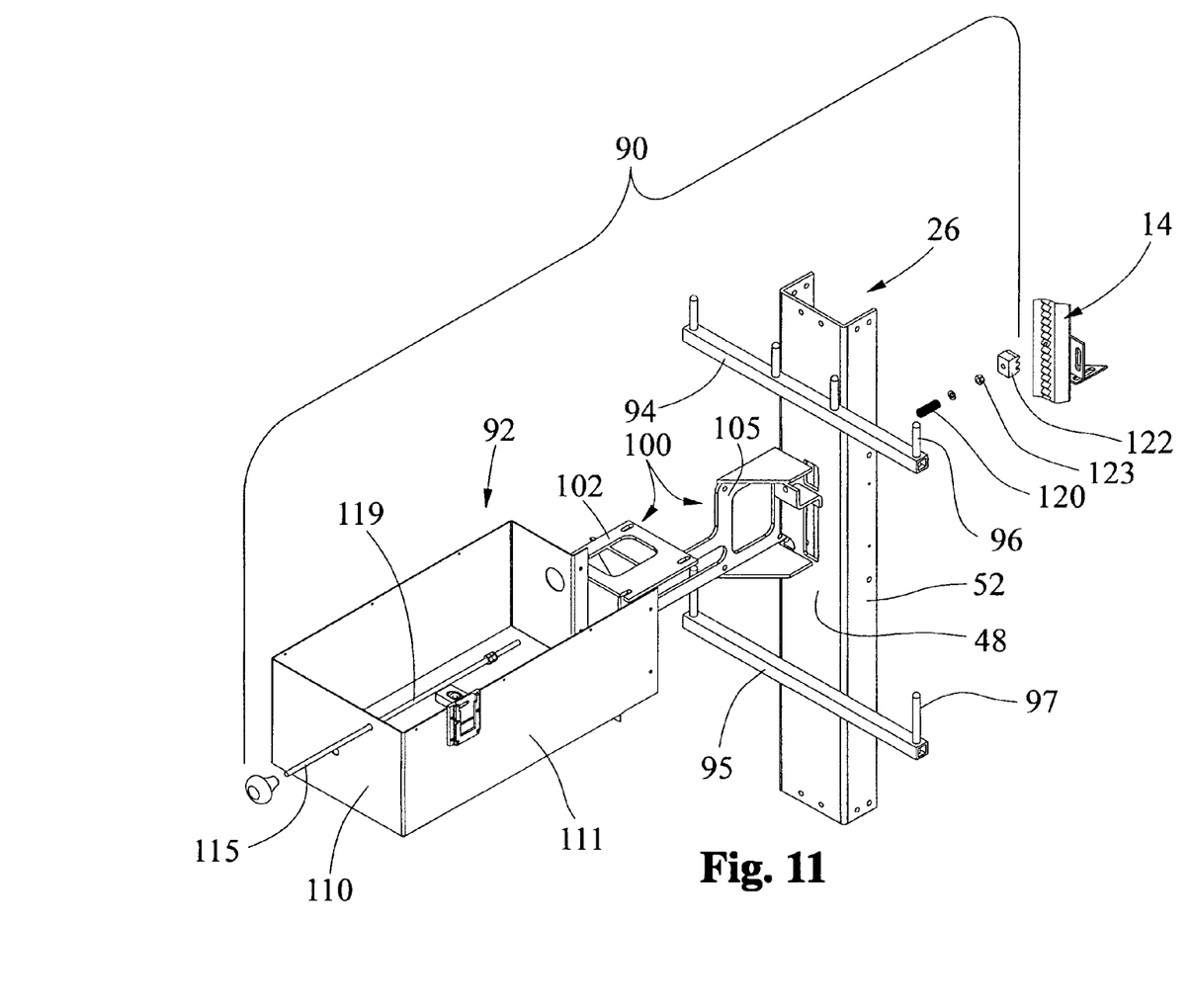
FIG. 11 is an enlarged, fragmentary, exploded isometric view of the preferred coupling assembly that interconnects the carriage with the shuttle with portions thereof omitted for clarity.

The assembled track 14 (i.e., FIG. 1) is surmounted by a vertically displaceable shuttle 26 (FIG. 5) through which the track extends. The shuttle 26 supports and is interconnected with a coupling assembly described later (i.e., FIGS. 6, 9-11). A preferably electric drive motor 103 and a rotatable drive gear 108 described later (i.e., FIG. 6, 11-12) engages the track 30. Carriage 12 is removably fitted to and supported by the coupling hardware (i.e., FIG. 11), so it travels vertically upwardly or downwardly relative to the track 30 with the shuttle 26 in response to motor operation. Shuttle 26 is prevented from being accidentally driven off of top track 19 by stops 20 (FIG. 2) on track section 19.

Figure 3:
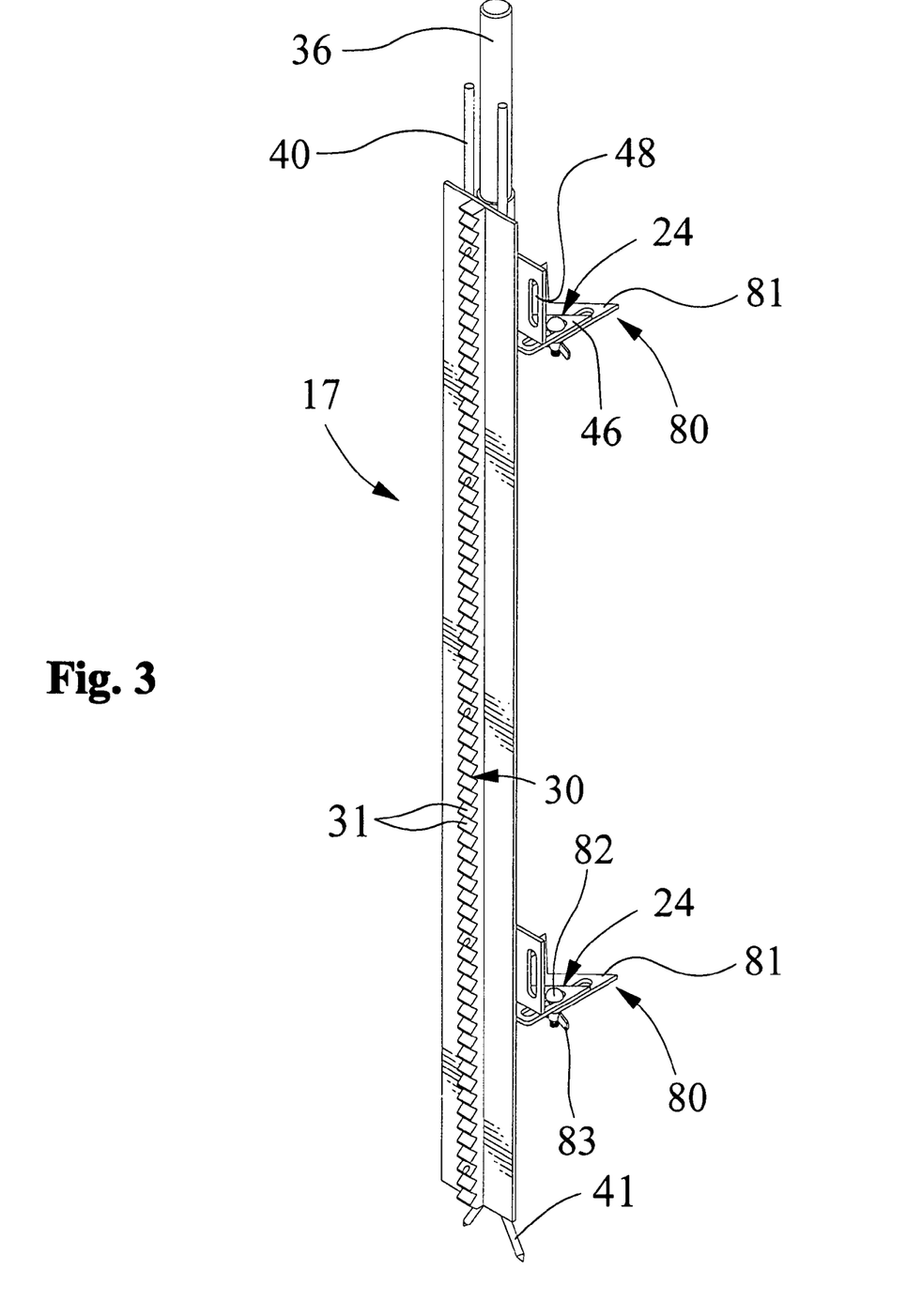
FIG. 3 is an enlarged, fragmentary, outer isometric view of the preferred track showing the geared rack.
Figure 4:
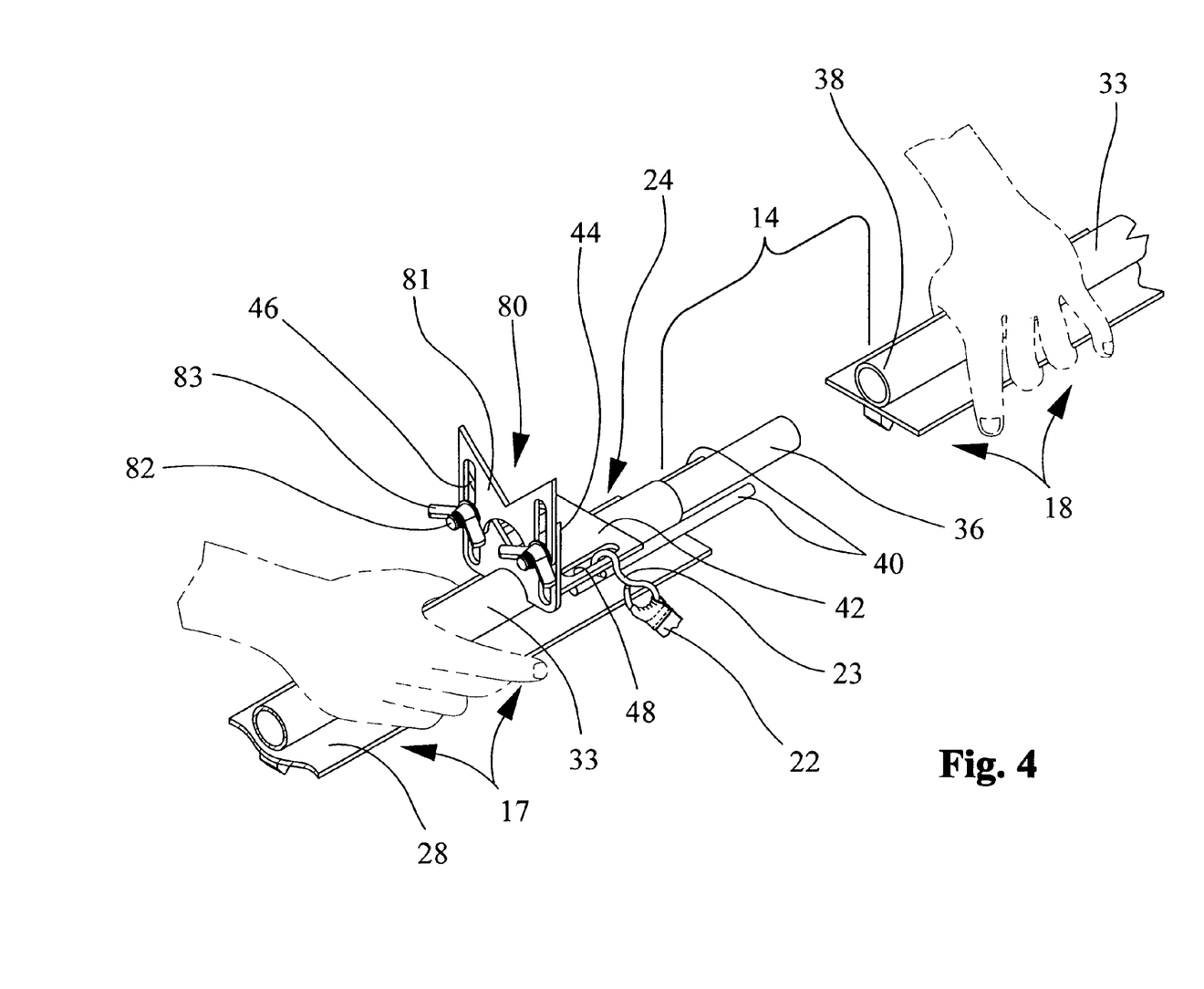
FIG. 4 is an enlarged, fragmentary isometric view of the inner side of the preferred track showing the ends of typical track sections that are to be axially fitted together.

With joint reference directed now to FIGS. 3 and 4, the track 14 comprises a plurality of similar track sections 17-19 that are to be fitted together axially and then secured to the tree 16 substantially perpendicular to the ground 15. Each track section comprises an elongated, rigid flange 28 that is generally rectangular. The front or outer side of each flange 28 supports a section of toothed rack 30 whose rigid teeth 31 are ultimately engaged by the motor-driven gear described later. The rack 30 is secured at the middle of the flange 28 by welding, and it extends along the entire length of the flange in parallel relation thereto. The rear or inner side of each flange supports a rigid, elongated sleeve 33 (FIGS. 4, 6) that is welded at the center of the flange rear. The rigid, tubular sleeve 33 is substantially coextensive with the flange 28 of each track section 17-19 and is parallel with the flange. The upper end of each sleeve 33 (i.e., FIG. 4) coaxially supports a smaller diameter coupling tube 36 that projects approximately six inches away from it. The reduced diameter of coupling tubes 36 enables it to fit within the interior diameter of the sleeve 33. In assembly each coupling tube 36 is coaxially fitted to a bottom sleeve end 38 of an adjacent track section to unite the track assembly. When properly assembled, aligned segments of the rack 30 abut gently and present a continuous rack with uniformly spaced apart teeth 31.

Each section of track 17-19 has a pair of alignment rods 40 proximate the upper end of its sleeve 33 that project outwardly, spaced-apart from and parallel with coupling tube 36. Rods 40 are welded at the sides of the sleeve 33, at the region where the sleeve borders the flange 28. As appreciated from FIGS. 4 and 6, for example, when two track sections are fitted together, rods 40 project forwardly to the next track section, aligning them proximate the lower sleeve end 38 in sliding contact with the flange 28 of the adjacent track section. Rods 40 thus prevent twisting as contact with the adjacent flange minimizes torsional displacements. The bottom of the bottom track section 71 has a pair of similar rods 41 that are non-parallel, and which anchor themselves within the ground.

As best seen in FIG. 4, the preferably two-piece brackets 24 have a preferably L-shaped cross section. Each bracket 44 comprises a flat base 42 welded to sleeve 33 that is parallel with and spaced-apart from flange 28. A perpendicular bracket section 44 is welded to base 42 and projects vertically away from the base. Perpendicular section 44 has a pair of slots 46 (FIG. 4) enabling it to mate with a similarly slotted plate 81 whose projecting, pointed sides on either aside of central notch 80 engage the tree. Plate 81 is adjustably, slidably secured to bracket section 44. Bolts 82 extend through the aligned slots 46 and wing nuts 83 are tightened to secure the plate 81 in a desired position. Slots 48 are defined in the base sections 42 of brackets 24 to receive ends of the encircling loops described earlier. As seen in FIG. 4, the end of loop 22 has a hook 23 that engages a slot 48 to mount the stand. The opposite end of the loop 22 may comprise an over-center clamp, or a turnbuckle, coupled to a similar hook engaging another bracket slot 48. During installation, adjustments to plate 81 enable the L-brackets 24 to adapt for minor irregularities in the outer surface of tree 16.

Figure 5:
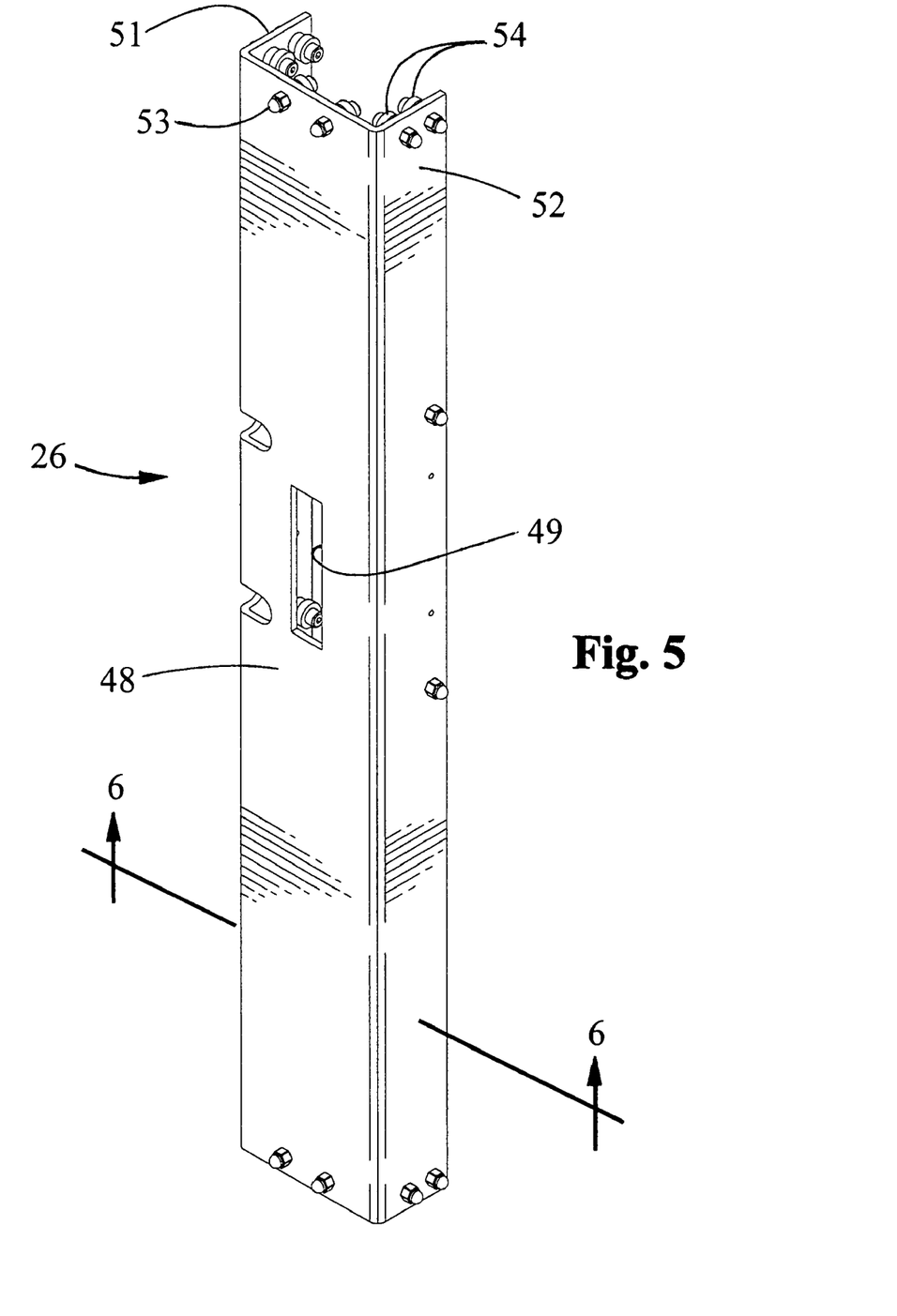
FIG. 5 is an enlarged, frontal isometric view of the preferred shuttle.
Figure 6:
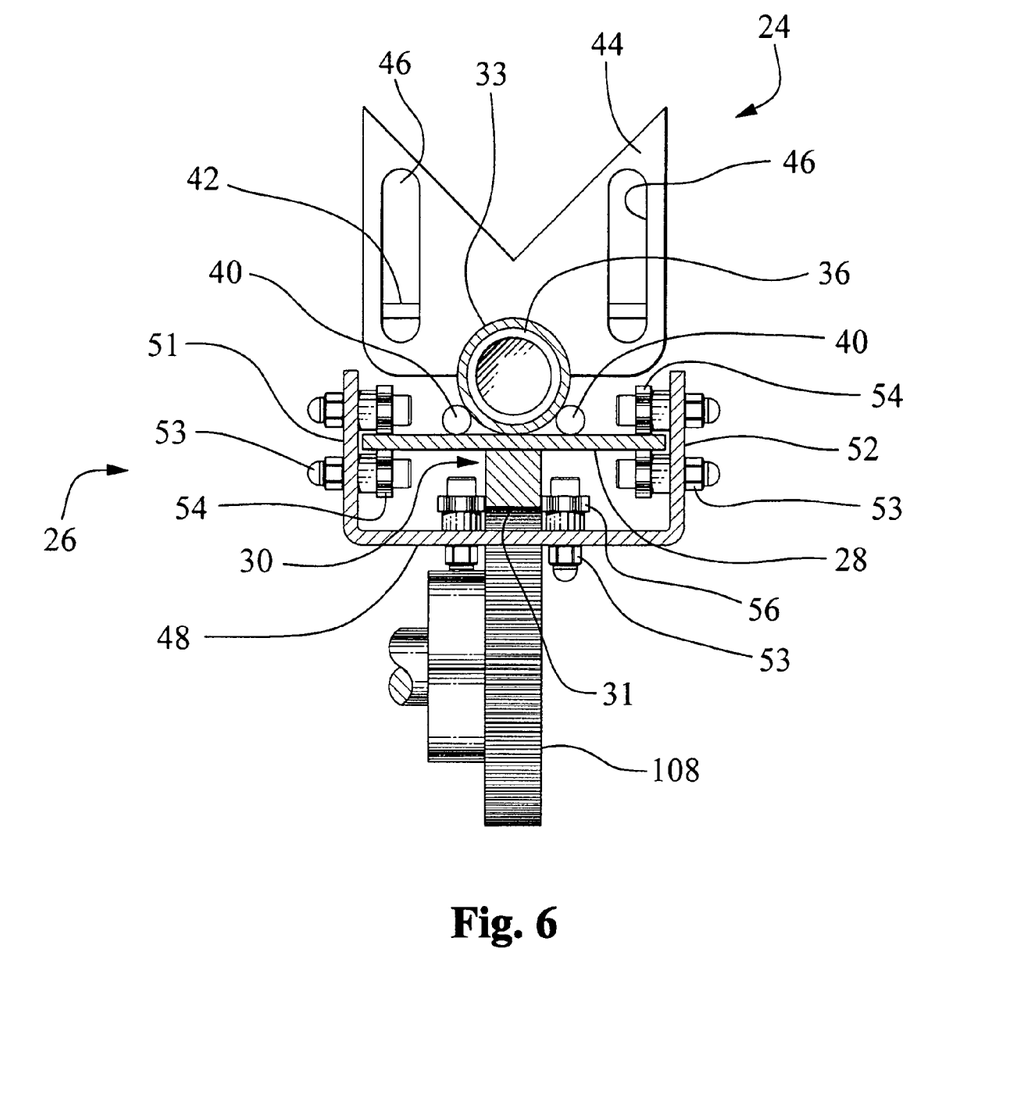
FIG. 6 is an enlarged, fragmentary sectional view showing how the shuttle surmounts the track, taken generally along line 6-6 in FIG. 5.

Referring now to FIGS. 5 and 6, the elongated shuttle 26 is of generally C-shaped cross section. The front panel 48 provides a mounting surface for the coupling hardware described hereinafter. An elongated access orifice 49 clears the drive gear described later, which engages the rack 30 positioned below it in assembly. Panel 48 is integral with a pair of parallel, spaced-apart sides 51 and 52 which are positioned, in assembly opposite the edges of the rack flanges 28 (FIG. 6). There are a plurality of pairs of spaced apart guide rollers 54 projecting inwardly of the shuttle from each side 51, 52, secured by fasteners 53. As seen in FIG. 6, for example, the track flanges 28 are positioned between and constrained by rollers 54 in use. A plurality of spaced-apart pairs of similar guide rollers 56 project inwardly from shuttle panel 48 and slidably adjoin opposite sides of the track 30, as best seen in FIG. 6.

Figure 7:
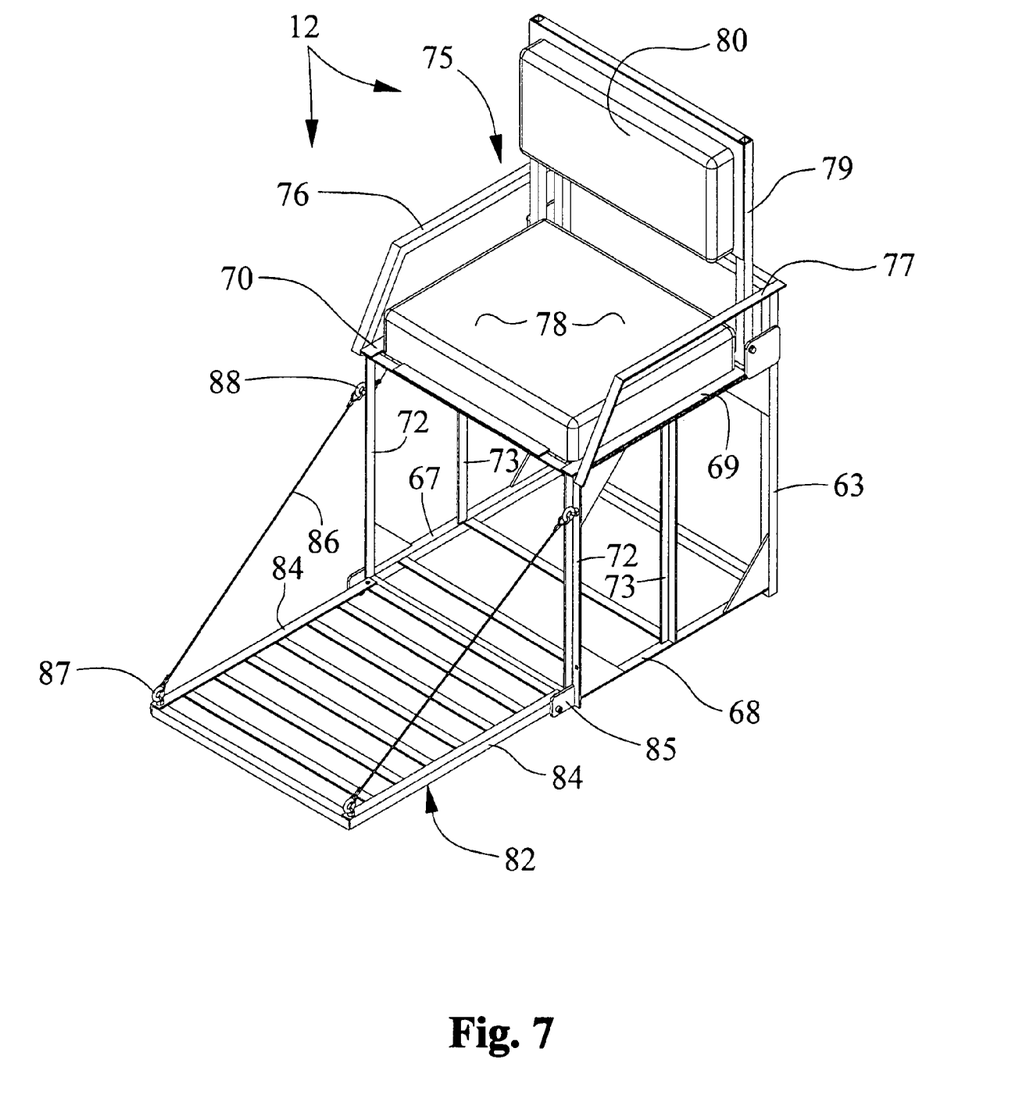
FIG. 7 is an enlarged, frontal isometric view of the preferred carriage.

The preferred carriage 12 is detailed in FIGS. 7-10. A rigid, generally cubicle frame 60 (FIG. 8) comprises parallel vertical legs 62 (i.e., FIG. 9) and 63 (FIG. 8) at the carriage rear and a pair of lateral supports 64 and 65 extending horizontally between them. Supports 64 and 65 comprise numerous spaced apart orifices 61, 66 respectively that are engaged when the carriage is user-fitted to the shuttle coupling means as described hereinafter. Spaced apart side rails 67 and 68 extend horizontally at the bottom of the carriage between the front and rear; upper frame rails 69 and 70 are spaced above lower support rails 68 and 67 respectively. Vertical supports 72 and 73 extend between the upper and lower frame rails for strength. In the best mode a seat 75 is preferably disposed atop the carriage frame. Hand rails 76 and 77 are mounted on each side of the seat 75 adjacent a comfortable cushion 78. Rails 79 support a back-supporting cushion 80. A generally rectangular footrest 82 has a pair of side rails 84 pivoted to the carriage frame by hinges 85. The footrest 82 is maintained in a substantially horizontal position during use by suitable cables 86 extending between clevis's 87 (FIG. 8) and 88 (FIG. 7).

Figure 8:
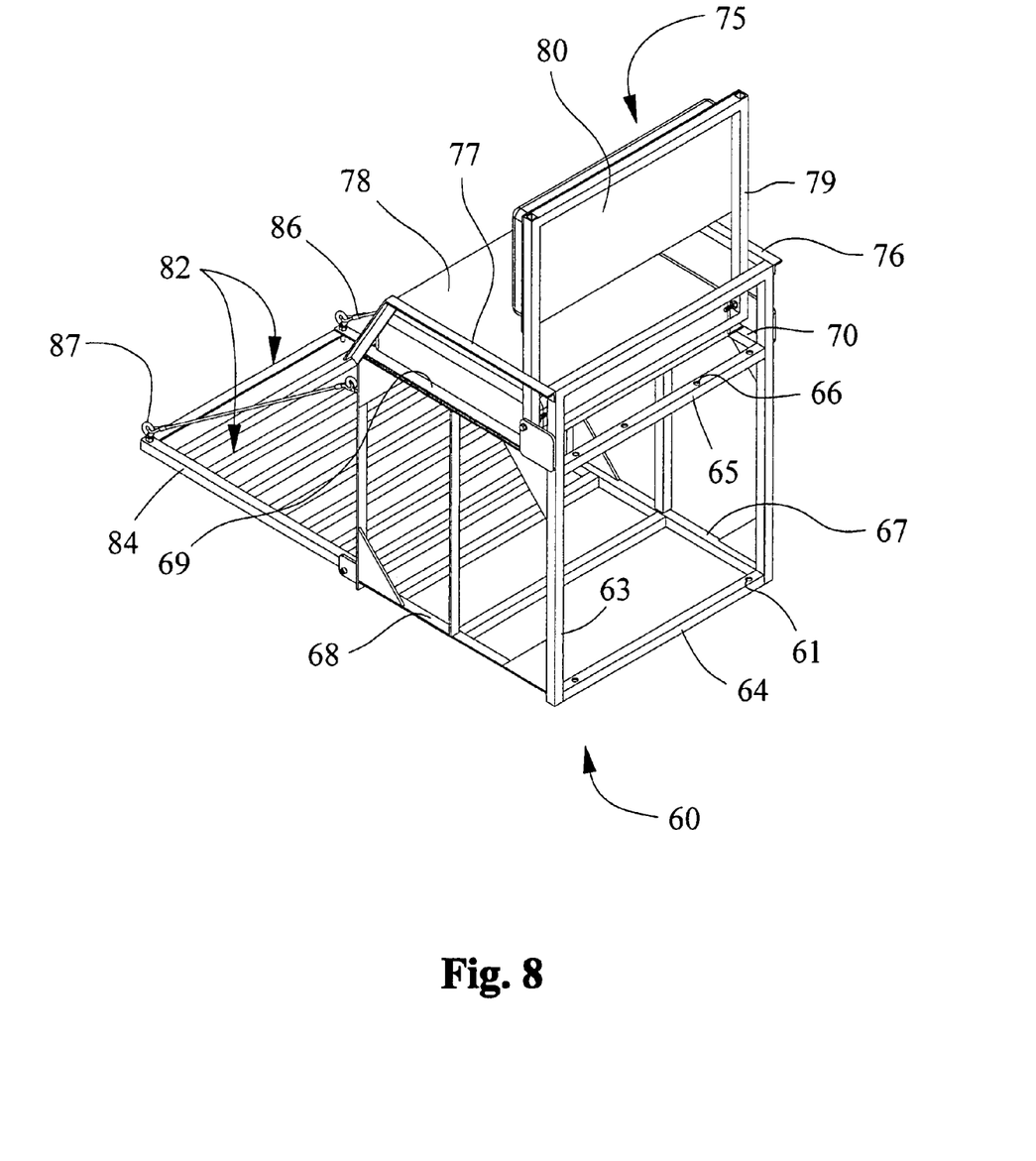
FIG. 8 is an enlarged, rear isometric view of the preferred carriage.

With joint reference directed now to FIGS. 9-12, the coupling assembly 90 (FIGS. 11-12) interconnects the carriage 12 with the shuttle 26 and track 14. The shuttle 26 is fitted with upper and lower, spaced apart wings 94 and 95 respectively that have upwardly projecting pins 96, 97 respectively. The carriage 12 is disposed upon the shuttle wings 94, 95. It is user-fitted to the shuttle by fitting pins 96 emanating from wing 94 (FIG. 11) into orifices 66 in cross piece 65 (FIG. 8). Similarly, pins 97 in wing 95 penetrate orifices 61 in carriage frame cross piece 64. The other coupling hardware seen in FIG. 11, for example, will be positioned beneath the seat 75 between the previously described frame members 62, 53, 65 etc.

Figure 12:
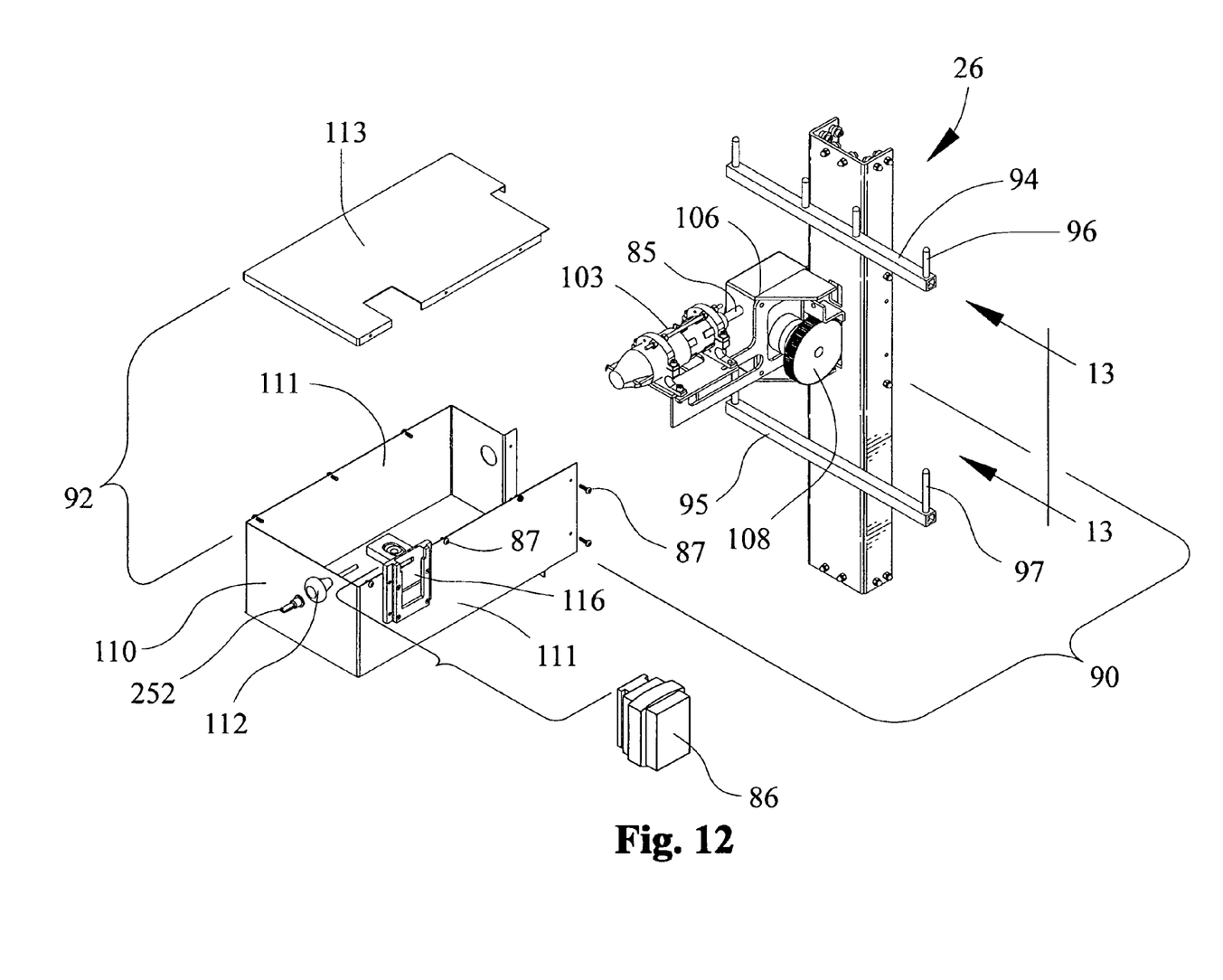
FIG. 12 is an exploded, fragmentary isometric view similar to FIG. 11 showing additional details including the motor, the motor housing and the gear drive assembly.
Figure 13:
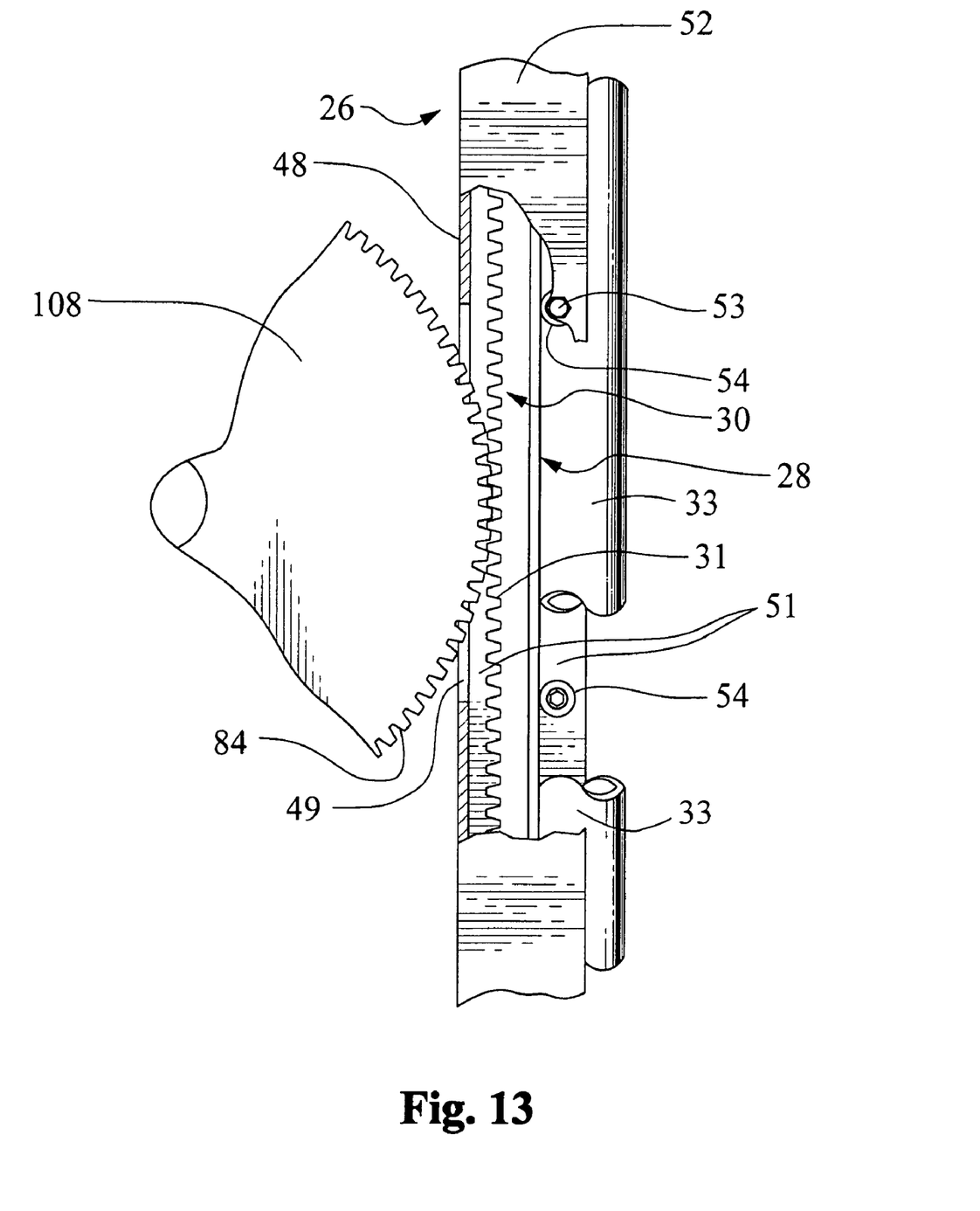
FIG. 13 is an enlarged, fragmentary view taken generally along line 13-13 of FIG. 12, with portions thereof broken away or shown in section for clarity.

Housing 92 is attached to sides 51 and 52 of carriage 26 by screws 87 shown in (FIG. 12). Cover 113 may be removed by removing similar screws. A support bracket 100 is fitted within housing 92. Bracket 100 has a horizontal support plate 102 (FIG. 11) upon which a drive motor 103 (FIG. 12) is secured. Similarly, bracket 100 has a vertically oriented support plate 105 that secures the drive gear assembly 106. A toothed drive gear 108 driven by preferably DC motor 103 is positioned so that it penetrates shuttle slot 49 (i.e., FIG. 5) and engages the rack 30 to propel the carriage. In assembly the motor 103, the gear drive assembly and related components are protected within housing 92. A preferably twenty-four volt battery 86 (FIG. 12) is disposed within battery holder 116 which is mounted to surface 111 of housing 92.

A safety lock is provided. Referencing FIG. 11, the front panel 110 of the housing 92 has a port through which an elongated lock actuator 115 extends. The lock handle 112 and actuator 115 must be deflected to operate the stand. A follower 119 coaxially engages a spring 120 and it secures a ratchet 122 attached by a nut 123. Ratchet 122 is yieldably biased towards the rack 30 (i.e., teeth 31) to lock the carriage in place when a desired elevation is attained, independently of the motor or driving system.

Figures 9, 10:
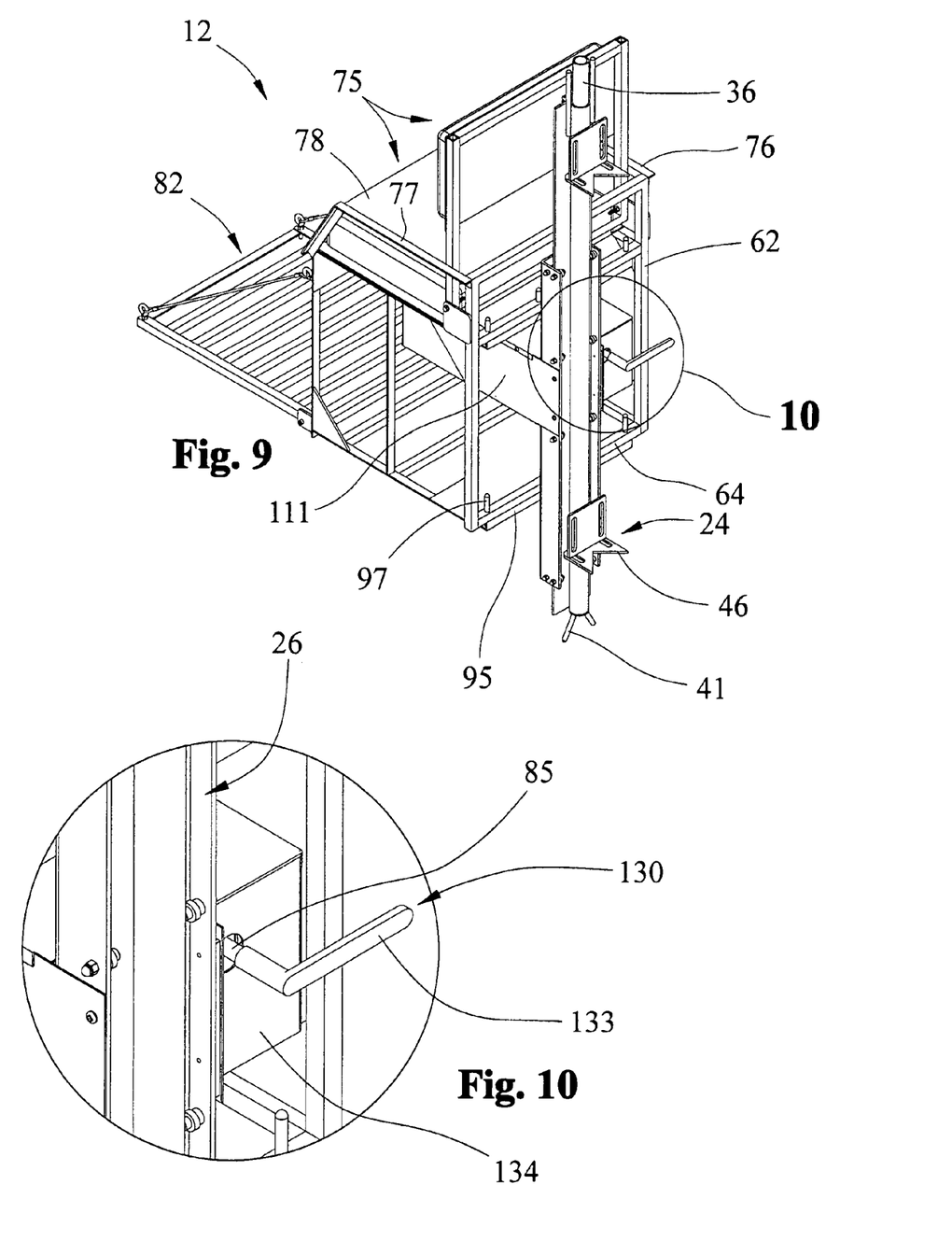
FIG. 9 is an isometric view of the preferred carriage similar to FIG. 8, but showing the auxiliary hand crank.
FIG. 10 is an enlarged, fragmentary isometric view derived from circled region "10" in FIG. 9.

Referring to FIG. 10, the shuttle 26 supports a manual cranking system 130 that can be used when and if the motor fails. A hand crank 133 drives motor shaft 85 which extends through drive gear assembly 106 within enclosure 134 and out to hand crank 133.

The alternate embodiment of a carriage 200 can be used by lineman to service power and telephone lines and is shown and described in (FIG. 14). Like carriage 12, carriage 200 uses spaced apart orifices 61 and 66 respectively that are engaged when the carriage is user-fitted to the shuttle 26 in the same manner as shown an described for carriage 12. Carriage 200 has a generally cube shaped frame with a foot platform 201 comprising several spaced apart, parallel angle bars 202 welded to perpendicular angle bars 203 and 204. Square bars 205 and 206 and 217 are welded to vertical supports 207, 208, 209, and 210. Hand rails 211 and 212 are mounted on each side of carriage. Square bar 213 is welded to bars 207 and 210 for rigid support. Vertical supports 215 extend between the upper cross bars 216 and lower bars 203 and 204. A safety bar 214 swings open when access or egress to the platform is desired. Gussets 218 are welded at the four bottom corners of the frame for support.

Figure 15:
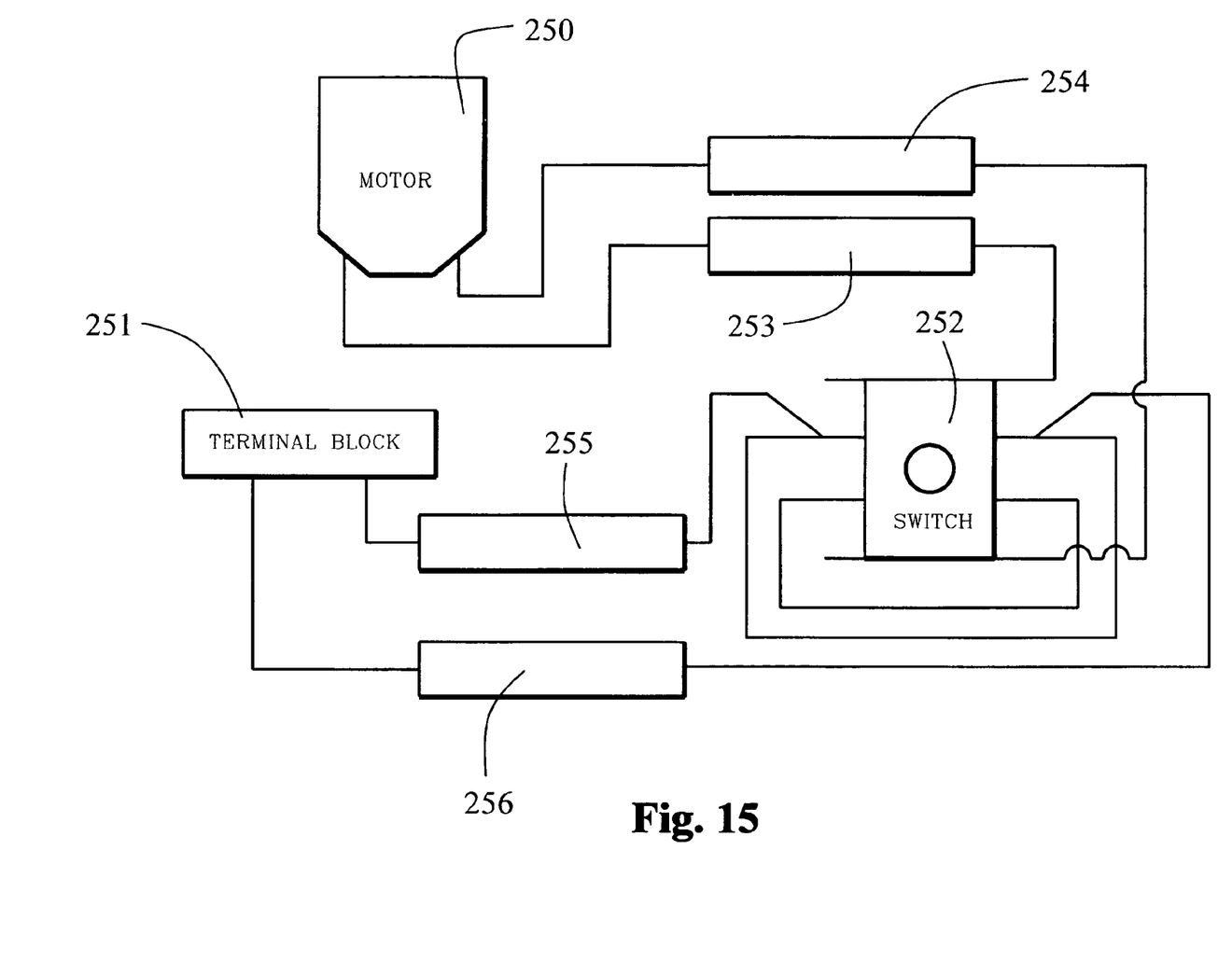

FIG. 15 illustrates the generalized electrical wiring scheme. A terminal block circuit 251 interconnects with a 24-volt DC battery pack. Power delivered across couplings 255, 256 delivers current to a high current relay switch 252 that includes a reversing function for changing current polarity. Current outputted from the relay stage 252 passes through circuits 253 and 254 tot energize the motor through coupling 250.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A motorized hunting stand for attachment to a tree, the stand comprising:

an elongated track comprising multiple, axially aligned track sections, each track section comprising:
a rigid, elongated flange comprising inner and outer sides;
a section of toothed rack coextensive with the flange at the outer flange side;
an elongated, tubular sleeve at the inner flange side, each sleeve having a base portion and a reduced diameter coupling tube portion adapted to be slidably coupled to an adjacent track section sleeve base portion;
a pair of parallel alignment rods on both sides of said sleeve and proximate said flange projecting outwardly with the sleeve coupling tubes for preventing twisting of joined track sections;
a bracket attached to each sleeve, each bracket comprising a vertical portion parallel with said sleeve and a horizontal portion, the vertical portion comprising a pair of spaced apart slots for receiving hooks and the horizontal portion comprising a notched plate adjustably coupled to it for engaging a tree;

a loop for attaching the section to a tree, the loop adapted to encircle a tree and the loop comprising hooks at each end for anchoring within said spaced apart slots in said vertical bracket portion;

a shuttle that rides upon the track, the shuttle fitted to and slidably penetrated by the track sections, the shuttle comprising a pair of rigid, spaced apart sides and a pair of rollers projecting inwardly from each side, each pair of rollers comprising a first roller engaging the inner side of the track flanges and each pair of rollers comprising a second roller engaging the outer side of the track flanges;

a carriage removably secured to the shuttle, the carriage comprising a seat for the user;

an electric drive motor for moving the shuttle and carriage up and down over the track;

reversible means for electrically powering the motor to rotate it in a desired direction; and, a gear driven by the motor engaging said rack for moving the shuttle and thus the carriage vertically upwardly or downwardly in response to the selected direction of motor operation.

2. The stand as defined in claim 1 further comprising a hand crank for moving the shuttle and carriage by hand when the electric drive motor fails.

3. The stand as defined in claim 1 wherein the shuttle supports a pair of spaced-apart wings for releasably engaging the carriage frame crosspieces to support the carriage during movement.

* * * * *